United States Patent [19]

Medding et al.

[11] 4,278,921

[45] Jul. 14, 1981

[54] CONSTANT SPEED ELECTRIC MOTOR

[75] Inventors: Reuben Medding, North Caulfield; Peter D. Kay, Glen Waverley, both of Australia

[73] Assignee: Consolidated Electronic Industries Proprietary Limited, Thornbury, Australia

[21] Appl. No.: 71,483

[22] Filed: Aug. 31, 1979

[30] Foreign Application Priority Data

Aug. 31, 1978 [AU] Australia .............................. PD5766

[51] Int. Cl.³ ............................................ H02P 6/02
[52] U.S. Cl. .................................... 318/254; 318/138; 318/439
[58] Field of Search .................... 318/138, 254 A, 311, 318/312, 326, 327, 329

[56] References Cited

U.S. PATENT DOCUMENTS

| 3,896,357 | 7/1975 | Tanikoshi | 318/254 A |
|---|---|---|---|
| 3,979,651 | 9/1976 | Bringol | 318/138 |
| 4,023,082 | 5/1977 | Tanikoshi | 318/254 A |
| 4,039,911 | 8/1977 | Tanikoshi | 318/254 A |
| 4,085,577 | 4/1978 | Natori | 318/311 |
| 4,119,859 | 10/1978 | Müller | 318/254 |
| 4,127,799 | 11/1978 | Nakamura et al. | 318/373 |

Primary Examiner—S. J. Witkowski
Assistant Examiner—John W. Redman
Attorney, Agent, or Firm—Murray and Whisenhunt

[57] ABSTRACT

A constant speed brushless D.C. motor of the permanent magnet outside rotor type with an internal stator wired in quadrature having a pair of Hall effect switches one of each mounted in proximity to one of a pair of opposite stator wirings to sense the direction and phrase relationship of the field in the rotor, a coarse feedback loop sensing back electromotive force in said motor including first comparator for comparing the negative generated motor voltage and motor potential said Hall effect switches operating under the influence of said first comparator to control power to said motor and thereby control its speed, a fine speed control loop including a tachometer for generating electrical pulses in proportion to motor speed upon rotation of said rotor, counter means counting said pulses and a second comparator connected to said counter means for comparing the frequency of said electrical pulses having a given frequency and the electrical pulses representing a steady desired preset motor speed providing a balancing potential difference at said second comparator thereby achieving a frequency lock to lock in the motor speed. An electrical dynamic brake is disclosed.

3 Claims, 6 Drawing Figures

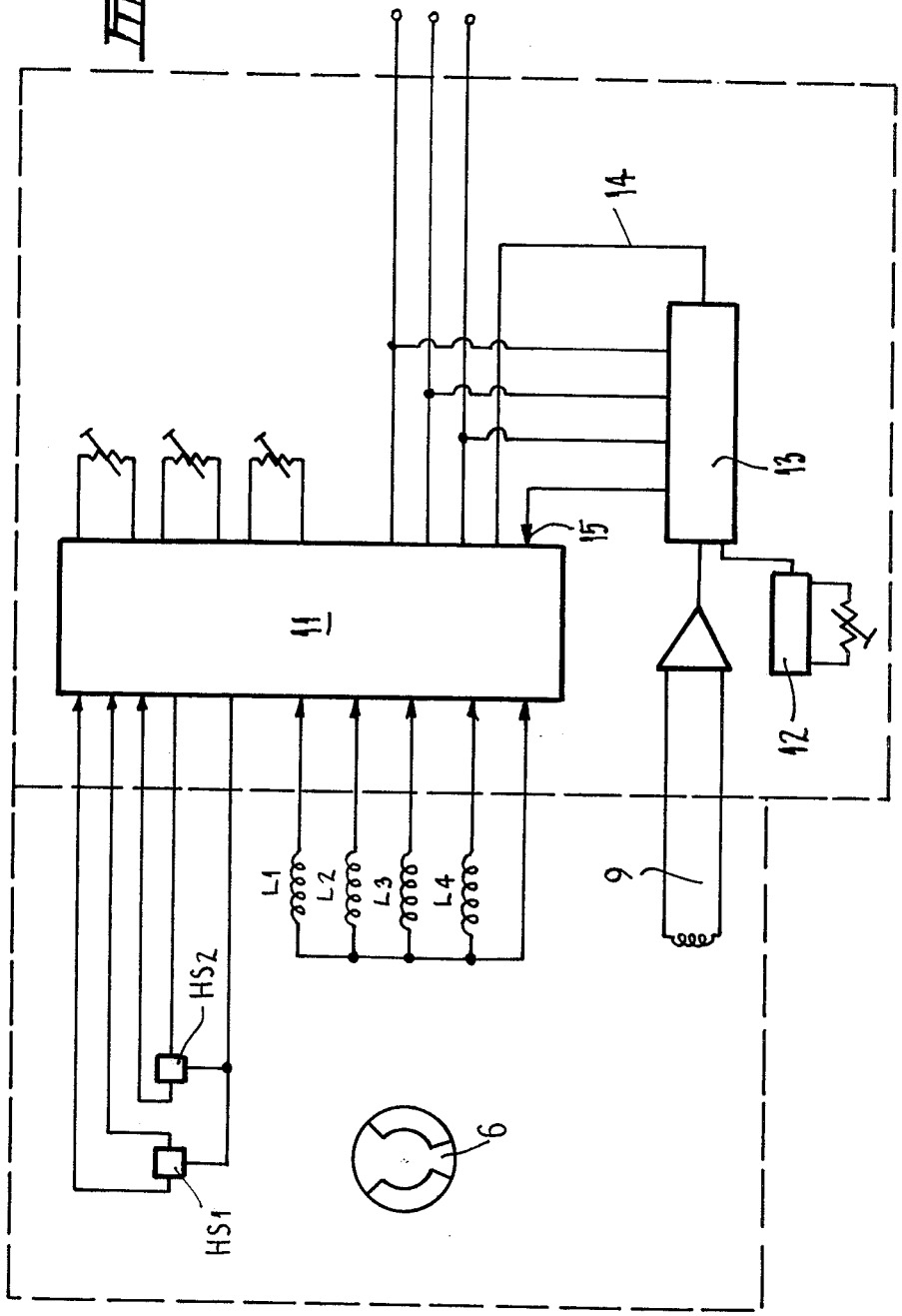

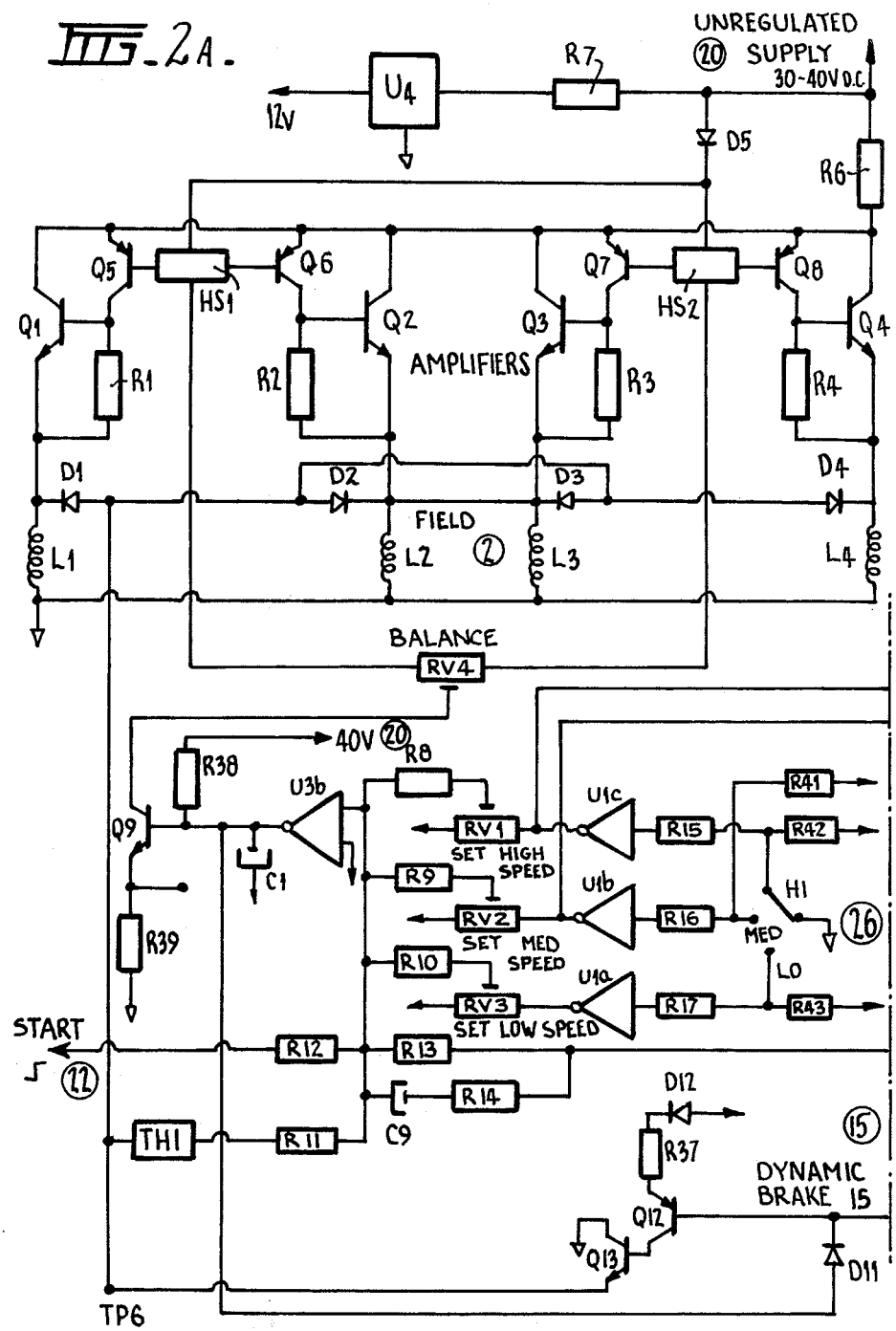
FIG_2A.

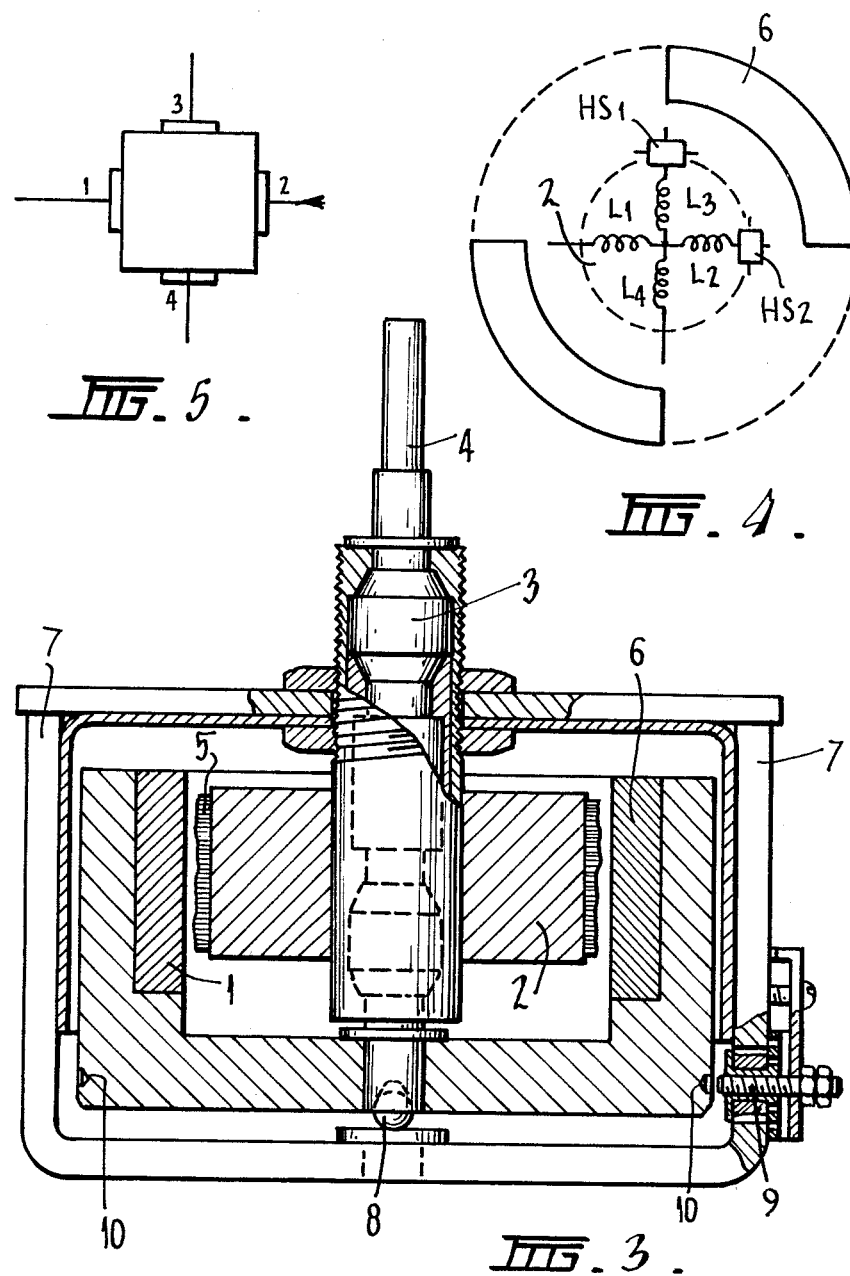

CONSTANT SPEED ELECTRIC MOTOR

BACKGROUND OF THE INVENTION

1. Field of Invention

This invention relates to a constant speed direct current motor and particularly but not exclusively to a motor for use in driving tape recorders and cartridge machines.

2. Description of Prior Art

Hysteresis synchronous motors are currently used in tape recorder and cartridge machine capstan drives. Where there is a constant frequency A.C. mains supply such drives exhibit excellent constant speed characteristics.

The use of D.C. motors for this purpose is not new, however, speed control is poor leading to serious problems with timing stability. Nevertheless D.C. motors have inherent advantages over A.C. synchronous motors:

(i) The D.C. motor is considerably more efficient than its A.C. counterpart thereby avoiding overheating problems.

(ii) The standard set speed of the D.C. machine is variable within narrow limits whereas the synchronous machine is fixed. Thus small speed changes must be achieved by changing the diameter of the drive capstan (as applied to a tape machine).

(iii) The D.C. machine is unaffected by frequency changes in the mains supply and voltage differences are easily catered for in the control circuitry.

Applicants are aware of U.S. Pat. Nos. 3,663,877 and 3,651,266 both to Clark relating to a brushless D.C. motor including a tachometer commutation circuit and a digitalization circuit. The digitalization circuit is used to digitalize analog signals generated by Hall effect switches in the winding of the motor. The Hall effect switches do not have any effective direct control of the coil windings in the Clark motor as disclosed. This digitalization of the analog signals creates eight digital signals which are used to identify the instantaneous angular position of the rotor. Simultaneously, a tachometer generates a set of pulses of constant frequency which are correlated with the digital signals to produce a set of phase related switching signals. Each of the phase related switching signals has a period corresponding to a full revolution of the rotor, and this defines a unique phase relationship therewith.

This appears to constitute the basis of operation of the Clark invention. The Clark motor is primarily designed for use on machines where it is necessary to have both accurate positional and speed information, for example in editing machines where information concerning the precise position of the tape is required. The Clark motor could be used in tape recorder and cartridge machines but this would not make sense technically because the motor would produce unnecessary positional information, and also because the cost would be increased significantly due to the digital circuitry.

SUMMARY OF INVENTION

It is an objective of the present invention to provide a constant speed D.C. motor having good speed control characteristics and other peripheral features to be explained in more detail later. For example, good starting torque; dynamic braking to avoid overrunning and run on characteristics.

There is provided according to the present invention a constant speed D.C. motor of the permanent magnet outside rotor type with an internal stator wired in quadrature, a pair of Hall effect switches one of each mounted in proximity to one of a pair of said windings to sense the direction and phase relationship of the field in the rotor, a feed back loop sensing back electromotive force (negative generated motor voltage) comparator means for comparing the negative generated motor voltage and motor potential to control drive to said switches and thereby drive said motor.

In a further aspect of the invention there is provided a constant speed brushless D.C. motor including at least a pair of Hall effect switches (known per se) buried in the motor stator windings for sensing the direction and position of the rotating motor magnetic field, a feed back loop comparator means in said loop, said comparator means being adapted to sense and compare motor negative electromotive force (back e.m.f.) and motor potential whereby the speed of said motor is held substantially constant. The present motor includes two sources of speed control namely, the fine outer speed control loop and a coarse inner speed control loop utilizing back e.m.f. generated by the motor in operation.

Conveniently the motor is adapted to generate pulses and includes means for counting said pulses, comparator means for comparing frequency of said motor pulses with a standard frequency pulse (representing a steady desired motor speed) also providing a balancing potential at said comparator means.

Conveniently the negative generated motor voltage (back e.m.f.) is converted to current which is required to exactly offset the motor current fed to a comparator means whereby current to the Hall effect switches is switched off effectively removing power from the motor windings. This speed control is relatively coarse.

Conveniently a fine speed outer control loop is superimposed over the previously described coarse speed control. Thus a group of integrated pulses produced by the motor directly proportioned to its speed of rotation is compared with a separate group of pulses having a constant frequency which exactly equates with the motor speed desired by comparator means thus achieving a frequency lock. By use of a down/up counter or integrator error is fed into the back e.m.f. speed control to provide fine tuning.

The motor pulses are conveniently produced by a variable reluctance type tachometer to produce a number of voltage pulses in each motor revolution, these pulses are converted to a voltage, this voltage is compared with one of opposite sign created by oscillator means. Thus a fine correction current is produced if the two voltages are not exactly matched. Additional velocity feedback means is also optionally provided to stabilise the fine control loop.

Conveniently control of the number of pulses produced by the oscillator allows in turn fine control of the motor speed. Thus the motor is frequency locked to the oscillator controlled fine speed control loop and can be run at any desired constant speed according to the oscillator setting.

It is understood that it is conventional to employ back e.m.f. to control the speed of standard D.C. motors, but this has not been used to control the speed of brushless D.C. motors, as in the present case. The use of "coarse" and "fine" loops to accurately control the speed of the present motor is important because of the desired use of the motor in tape recorder and cartridge machines. In such machines, it is generally not required to know the precise position of the tape, and accordingly, it is not necessary to incorporate any circuitry which will provide positional information regarding the tape.

The invention will be described in more detail having reference to the accompanying drawings in which:

BRIEF DESCRIPTION OF THE DRAWINGS

FIG. 1 is a generalised schematic circuit diagram of the motor control circuit.

FIGS. 2, 2A and 2B are detailed circuit diagrams of the motor control circuit.

FIG. 3 is a sectional view of the motor construction.

FIG. 4 is a schematic view of the motor fields.

FIG. 5 is a more detailed view of a Hall effect switch.

DESCRIPTION OF THE PREFERRED EMBODIMENTS

Figure 2B:
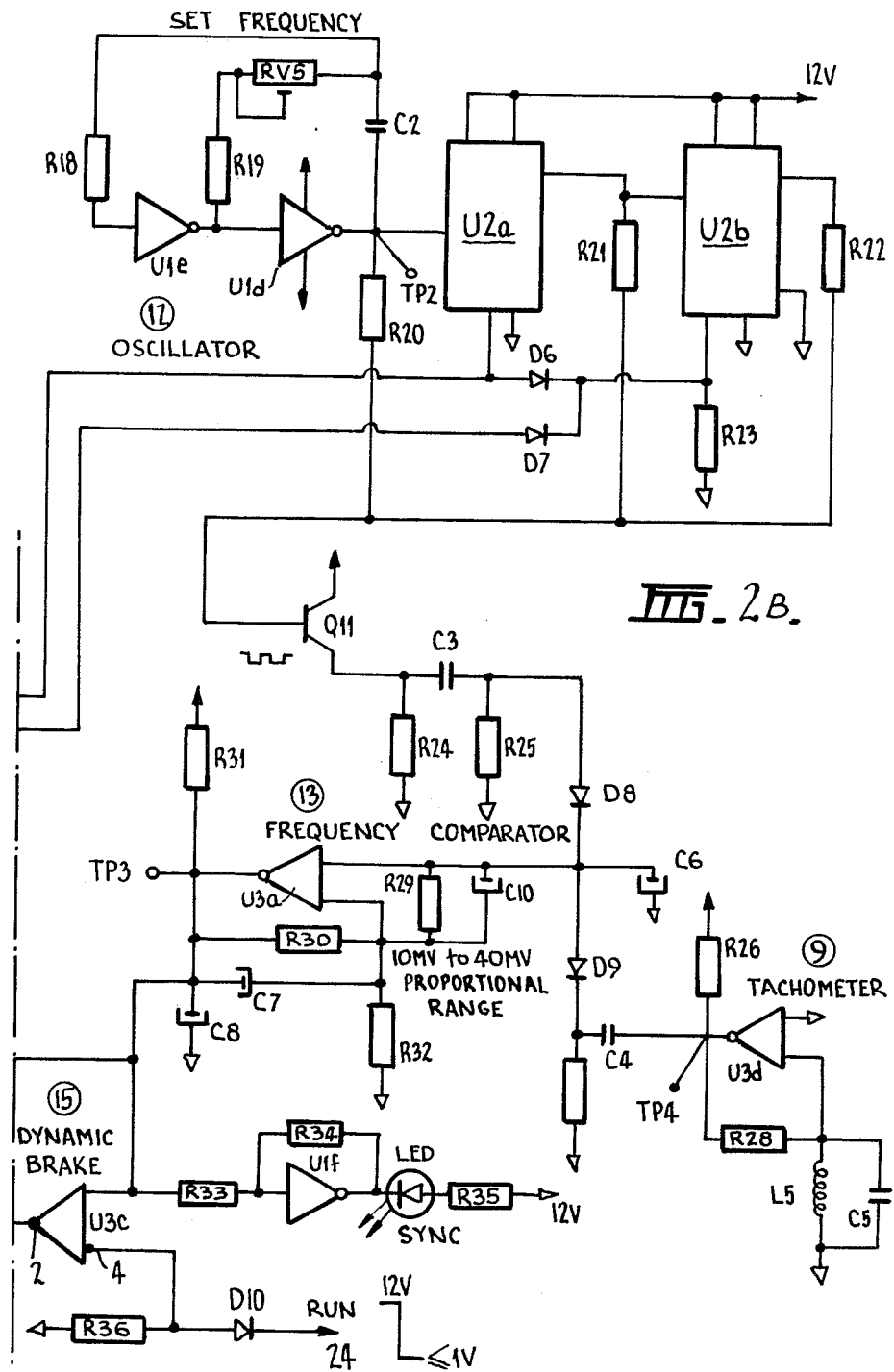

Referring to FIGS. 3 and 4, the motor is of a multiple speed brushless D.C. outside rotor type having a rotor 1 and a stator 2 mounted internally of the rotor. The motor is well suited to driving a capstan wheel of tape recording apparatus. The rotor 1 has an open top allowing self-aligning bearings 3 to be mounted on the shaft in close proximity to the major weight distribution of the rotor. The stator includes quadrature windings $L_1$, $L_2$, $L_3$ and $L_4$ generally indicated as 5 in FIG. 3. The rotor includes a pair of permanent magnet poles 6. Hall effect switches HS1 and HS2 are mounted within the stator windings and are responsive to the magnetic poles whereby the switches sense the location and direction of movement of the poles as the rotor rotates about the stator.

HALL EFFECT SWITCHES

Referring to FIG. 5 these switches are miniature four terminal devices which sense the direction of a magnetic field directed perpendicular to the plane of the switch which in the drawing is the plane of the paper.

A bias current of about 5MA is driven from terminal 2 to terminal 1. Under no magnetic field terminal 3 and 4 have no potential difference between them. As the magnetic field is increased in a direction directed into the page a potential difference will occur between terminals 3 and 4. The magnitude of the potential difference depends on the magnetic field strength and the bias current. (Typically 200 m V/Ma/Tesla). A magnetic field in the reverse direction directed out of the page will create a reverse potential difference ($-200$ m V/MA/Tesla) (1 Tesla = $10^5$ Gauss = 1 Weber/sq. meter).

The output of the Hall effect switches is amplified to create a field in the stator windings which always leads the permanent magnet field by an average of 90 degrees and hence creates an accelerating torque in the motor. Thus the motor would behave as a series D.C. motor, if this torque was allowed to act in an uncontrolled manner and the speed of the motor would be limited only by motor losses (say 4000–6000 Rpm). Accordingly it is necessary to control the speed of the motor and details of such control will follow. The support bar 7 and ball bearings 8 allow the motor to be operated at any desired direction between vertical and horizontal.

Slots 10 are equi-spaced around the periphery of the rotor. In this application there are 125 slots. Mounted in the support bar 7 a reluctance tachometer 9 is adapted to detect the presence of each of the 125 slots during rotation of the rotor 1. Thus 125 voltage pulses are produced in every revolution.

SPEED CONTROL

To control the speed of the motor, two feedback loops are employed which comprise a coarse speed control inner loop and a fine speed control outer loop. The coarse loop is designed to hold motor speed to about 1% to 2% regulation whilst the fine loop reduces this regulation to about 0.1%. The speed control device will be described having reference to FIG. 1 which shows a block diagram of the circuit. The field windings 2 ($L_1$, $L_2$, $L_3$, $L_4$) of the motor stator are alternatively switched by the magnetic Hall effect switches 3 thereby creating a rotating field leading the rotor field thereby forcing the rotor to rotate. Switching transistors are controlled by the Hall effect switches 3 to effect switching of the four field windings.

The controller includes an inner loop 11 which utilises the motor back electromotive force as a measure of the motor speed. This circuitry will be described in greater detail later.

The outer loop incorporates a tachometer 9 mounted on the motor giving 125 pulses per motor revolution. A stable oscillator 12 combines with a programmable divider 13 to measure the speed error as indicated by the number of pulses generated by the tachometer and those of the oscillator. An error signal 14 is generated where there is a speed error which is fed back to the inner loop summing junction.

The error signal 14 is differentiated to provide an acceleration feedback signal which is also applied to the system summing junction to improve the stability of the system.

A dynamic brake 15 is provided and is used whenever the speed of the motor exceeds that normally encountered, e.g. a practical excess speed of say 2% will cause the brake to operate. This is normally encountered when the selected speed is reduced or the motor is switched off.

Referring to FIGS. 2, 2A and 2B, these show a detailed circuit diagram of the motor and control circuit.

Coils L1, L2, L3 and L4 generally designated 2 are the four quadrature windings on the motor stator. "Hall effect" switches HS1 and HS2 are buried in the quadrature windings to sense the direction and position of the permanent magnet rotor field. FIG. 1 shows the phase relationship of windings relative to said Hall effect switches. Complimentary Darlington amplifiers Q5-Q1, Q6-Q2, Q7-Q3 and Q8-Q4 amplify the Hall effect switch outputs to create a field which always leads the permanent magnet field by an average of 90 degrees and hence creates an accelerating torque on the rotor.

Uncontrolled, this motor would behave as a series D.C. motor, where speed is limited only by motor losses and friction (typically 4000–6000 R.P.M.). To control the speed of the motor, two feedback loops are employed, viz coarse inner loop 11 and a fine outer loop. The capstan (not shown) tape drive diameter is chosen to give a surface speed of 7½ inch/sec. (19.05 m.m./sec.) when the capstan speed is 10 revs./sec. which is equivalent to a motor speed of 600 R.P.M.

The inner loop is a voltage loop generated by diodes D1 to D4 which pick up the negative generated motor voltage, the magnitude of which is proportional to the speed of the motor. This negative "generated" voltage is converted to a current by R11, which must exactly offset the current from resistors 8, 9 or 10, before comparator U3b cuts off drive to Q9 base and hence removes drive from the Hall effect switches, which in turn removes power from the motor field windings. Put another way referring to FIGS. 2A and 2B to control the speed of the motor the negative peaks of the generated voltages in L1, 2, 3 and 4 are rectified by diodes 1, 2, 3 and 4 and therefore draw current from the summing junction of U3 B (pin 9) via resistor R11 and thermistor TH1. At the same time resistors R8 or R9 are sourcing current to the junction.

When the sink current is equal to the source current, the bias current to Hall switches HS1 and HS2 is reduced via Q9 which is driven from the output of comparator U3 B. This procedure effectively changes the "series" type motor to a "shunt" type motor. Each of the resistors R8, R9 or R10 represent a speed setting, high, medium and low.

The fine control (outer loop) involves a digital comparison of frequency between a tachometer 9 and a stable oscillator 12 (U1e and U1d).

The tachometer 9 is a variable reluctance type which generates 125 pulses per revolution of the motor. These pulses are amplified by U3d to deliver a square wave at test point 4 (TP4) having a frequency of 1250 Hz when the motor is running at 600 R.P.M. On the negative going edge of each pulse, capacitor C4 and diode D9 inject a precise negative charge onto capacitor C6, so that the faster the motor spins the more negative the voltage on C6.

Capacitor C4 "differentiates" this square wave to produce 1250 Hz pulses, and diode D9 removes or absorbs the negative going pulses tending to charge capacitor C6 negatively. At the same time capacitor C3 is "differentiating" a square wave derived from oscillator U1d and U1e and transistor Q11. Thus the positive going pulses from C3 are removed or absorbed by D8 tending to charge capacitor C6 positively once per oscillator period.

Comparator U3a (comparator 9), connected as a high gain operational amplifier, amplifies the voltage on capacitor C6, to give an overall fine correction voltage at test point TP3 which is supplied via resistor R13 to the summing junction of comparator U3b. The nett effect is that if the motor speed is low the output from the comparator U3a at test point TP3 is high (10 V), and conversely, if the motor speed is too high the voltage at TP3 is low (0 V). Additional velocity feedback is also supplied via capacitor C9 and resistor 14 to stabilize the fine control loop. Oscillator U1e and U1d is a very stable temperature compensated CMOS oscillator whose frequency is adjusted by RV5.

As the motor controller has been designed to operate at three harmonically related speeds (1:2:4), the oscillator 8 must be divided by 2 when operating at the medium speed and divided by 4 when operating at the low speed.

This division is performed by U2a and U2b and the desired frequency is selected by D6 and D7 and Q11.

Inverter U1f is wired as a buffer to illuminate LED1 to indicate when fine control loop has "frequency locked" the motor.

DYNAMIC BRAKING OPERATION

Brushless D.C. motors do not have the facility of "powering" speed reduction but can only rely on mechanical losses to reduce speed.

In a high inertia load environment i.e. capstan motors, it can take 10 to 15 seconds to reduce the speed from 30 revolutions per second which represents (fast forward speed) to 10 R.P.S. (normal speed). To overcome this dynamic or eddy current braking is employed according to the invention by shunting windings L1, 2, 3 and 4 via diodes D1, 2, 3 and 4 whenever the tachometer frequency exceeds the oscillator frequency.

This change in frequency is detected by measuring the voltage at test point TP3 using comparator U3C. The voltage at point 4 of U3C is held at 1 volt. Whenever the voltage at TP3 connected to the positive input of U3C) drops below 1 volt, the output of U3C at point 2 is at 0 volts. The low output of U3C at point 2 has two effects:

(a) Removes drive on the Hall effect devices HS1 and HS2 by earthing Pin 14 of U3B via D11.

(b) Shorts out windings L1, 2, 3 and 4 via diodes D1, 2, 3 and 4, by turning Q12 and Q13 on.

The dynamic brakes are applied as long as the tachometer frequency is higher than the oscillator frequency or the RUN line connected to point 4 of U3C is taken to a high voltage of say 12 volts.

This occurs in normal operation say when a lower speed is selected.

Thus in operation diode D11 removes drive from the power stage while dynamic braking is in process. The input to diode D10 (RUN) will start the motor if LOW or stop the motor if HIGH. Start input via R12 can be used as a "phase lock" input if motor was used in a "pilot tone" type recorder to ensure the pilot tone on the tape is replayed at the correct frequency, or as an additional drive to the summing junction to avoid "START WOW" when pressure roller is engaged.

EXTERNAL CONTROLS AND INPUTS

Power Supply (Pin 20)

The motor requires an unregulated 30 to 40 volt 1 amp supply to operate. An in circuit 12 volt regulator supplies regulated power to critical circuits.

RUN—PIN 24 is connected to a cartridge tape micro switch (not shown) and requires a voltage of less than 1 volt to stop the motor or greater than 12 volts to start it.

START—PIN 22 receives a high voltage (20–24 V) when the pressure roller (not shown) is engaged. This gives a slight increase in operating power via R12, to compensate for friction losses due to loading of pressure roller on motor.

Select High Speed (PIN 27)

A low voltage (less than 3 volts) on this points causes U1C output to be at 12 volts, enabling potentiometer RV1 and disabling counters U2A and U2B thus delivering 2500 Hz to the comparator as the reference frequency. The comparator (U3A) is only stable when the tachometer is delivering 2500 Hz i.e. 20 revolutions/sec. or capstan speed of 15 inches/sec.

Select Medium Speed (PIN 26)

A low voltage (less than 3 volts) on this point enables medium speed potentiometer (RV2) and disables counter U2B (via D7), thus delivering 1250 Hz frequency to comparator U3A which is only stable when capstan motor is running at 10 revolutions/sec. or 7½ inches/sec. capstan speed.

Select Low Speed (PIN 25)

A low voltage (less than 3 volts) on this point enables potentiometer RV3 and allows divider U2A and U2B to divide oscillator (U1E and U1D) frequency by 4, thus delivering 625 Hz to the comparator U3A which is stable when motor speed is 5 revolutions/sec. (3¾ inches/sec. capstan speed).

SET HIGH SPEED

RV1 is used to preset the fast forward speed to 20 revolutions per second (15 inches/sec. capstan surface speed).

SET MEDIUM SPEED

RV2 is used to preset the coarse control loop speed at 10 revolutions per second (7½ inches/sec. capstan surface speed).

SET LOW SPEED

RV3 is used to preset for low speed (3¾ inches/sec. capstan surface speed).

SET FREQUENCY

RV5 in the oscillator 12 is used to trim the normal speed to the required accuracy.

BALANCE

RV4 is used to balance the drive to the two Hall effect pairs HS1 and HS2 this is set to minimise wow and flutter.

EXTERNAL INDICATION

A light emitting diode LED6 is a useful device to ascertain at a glance the performance of the system at normal speed viz:
(a) LED at half brilliance is correct setting
(b) LED flashing indicates SET SPEED is set too high or SET FREQUENCY RV5 is too low.
(c) LED fully ON indicates SET SPEED is set too low or SET FREQUENCY RV5 is set too high.

The invention has been particularly described when having reference to a three speed machine. However, there are two speed applications e.g. in the playing of tape cartridges and such operation is achieved with only minor modification of the circuit.

We claim:

1. A constant speed brushless D.C. motor of the permanent magnet outside rotor type with an internal stator wired in quadrature having a pair of Hall effect switches one of each mounted in proximity to one of a pair of opposite stator wirings to sense the direction and phase relationship of the field in the rotor, a coarse feedback loop sensing means for comparing the negative generated motor voltage and motor potential, an outer fine speed control loop superimposed over said coarse feedback loop, said outer loop including means for producing a group of integrated pulses representing the speed of the motor, second comparator means in said outer fine speed loop for comparing a separate group of integrated pulses having a constant frequency which is substantially exactly equated with a desired motor speed thereby achieving a frequency lock, said Hall effect switches operating under the influence of said comparator means to control power to said motor and thereby control its speed.

2. A motor as claimed in claim 1 wherein said means for producing said integrated pulses representing the speed of the motor is a variable reluctance type tachometer capable of producing a number of said pulses in each motor revolution, means for converting said pulses to a voltage of predetermined polarity, oscillator means producing a voltage of opposite polarity from said separate group of integrated pulses, said second comparator means being adapted to compare said voltages such that a correction current is produced if said two voltages of opposite polarity are not matched.

3. A motor as claimed in claim 2 wherein means are provided to vary the number of integrated pulses in said separate group so as to vary the level of the voltage of said opposite polarity.

* * * * *